United States Patent [19]

Rogers

[11] Patent Number: 4,826,140
[45] Date of Patent: May 2, 1989

[54] SUSPENSION SYSTEM FOR A VEHICLE

[76] Inventor: Ralph R. Rogers, 733 W. 21st, So. Sioux City, Nebr. 68776

[21] Appl. No.: 14,865

[22] Filed: Feb. 17, 1987

Related U.S. Application Data

[63] Continuation-in-part of Ser. No. 819,591, Jan. 17, 1986.

[51] Int. Cl.$^4$ .................. B60G 11/34; F16F 1/26; F16F 13/00
[52] U.S. Cl. .................. 267/32; 267/151; 267/241; 267/263; 280/712
[58] Field of Search .................. 267/31, 32, 25, 54 R, 267/54 C, 151; 280/711, 712, 715

[56] References Cited

U.S. PATENT DOCUMENTS

| 923,162 | 6/1909 | Garvey | 267/32 |
| 1,113,370 | 10/1914 | Ostendorf | 267/241 |
| 2,290,620 | 7/1942 | Brown | 280/711 |
| 2,988,352 | 6/1961 | Masser | 267/56 X |
| 3,309,107 | 3/1967 | Chieger | 267/31 X |
| 3,499,662 | 3/1970 | Paul | 267/31 X |
| 3,970,293 | 7/1976 | Sweet et al. | 267/31 |
| 4,009,873 | 3/1977 | Sweet et al. | 267/31 |
| 4,097,034 | 6/1978 | Sweet et al. | 267/241 |
| 4,580,798 | 4/1986 | Roelofs | 280/712 X |

Primary Examiner—George E. A. Halvosa
Attorney, Agent, or Firm—Zarley, McKee, Thomte, Voorhees & Sease

[57] ABSTRACT

An improved suspension system for a vehicle is provided which interconnects the leaf spring assemby positioned adjacent each of the frame members of a vehicle. The suspension system comprises first and second supports which are positioned below the rearward ends of the leaf spring assemblies and which have their forward ends pivotally secured to the axle housing of the vehicle. The first and second supports are connected, forwardly of the rearward end thereof, to the associated leaf spring. A third support is connected to the rearward ends of the first and second supports and extends therebetween beneath the frame members of the vechicle. A pair of air springs are mounted on the third support between the frame members of the vehicle and have their upper ends operatively secured to the frame members of the vehicle.

1 Claim, 5 Drawing Sheets

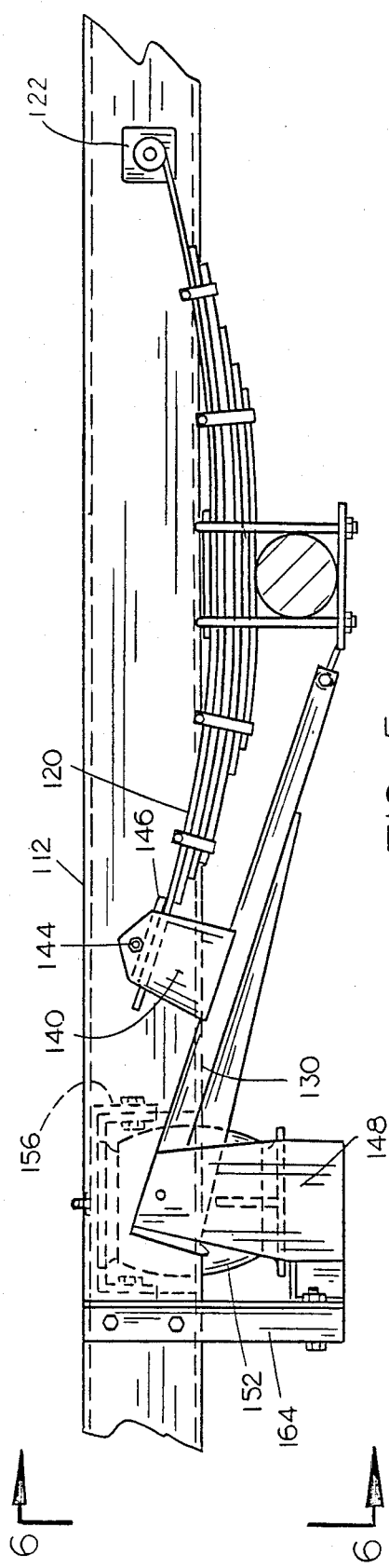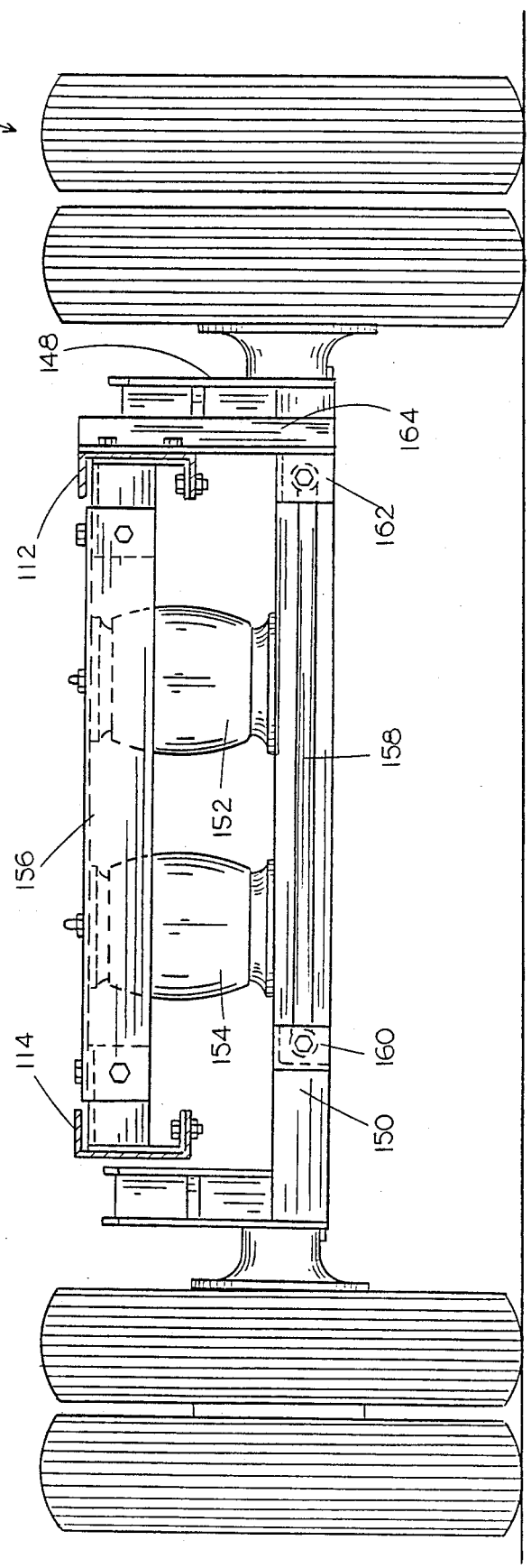
FIG. 5
FIG. 6

4,826,140

SUSPENSION SYSTEM FOR A VEHICLE

CROSS REFERENCE TO RELATED APPLICATION

This application is a continuation-in-part application of Ser. No. 819,591 filed Jan. 17, 1986.

BACKGROUND OF THE INVENTION

Conventional single axle trucks normally have a transversely extending axle which is positioned beneath longitudinally extending frame members. Ordinarily, a leaf spring assembly connects each of the frame members to the axle. The conventional suspension system just described results in a less than smooth ride. Further, the conventional suspension system does not have the ability to compensate for very heavy loads. Some attempts have been made to provide air suspension systems for trucks to overcome the disadvantages of the conventional leaf spring systems, but the same are extremely expensive and normally may not be installed on the truck after the truck has been manufactured.

The invention disclosed in my co-pending application represented, in my opinion, a significant advance in the art. However, it has been found that in certain types of vehicles, it is impractical or difficult to position the air springs outwardly of the frames of the vehicle as disclosed in the co-pending application. Further, it has been found that it is advantageous to mechanically interconnect the air springs to create an interaction therebetween to enhance the stability of the suspension system.

Therefore, it is a principal object of the invention to provide an improved suspension system for a vehicle.

A further object of the invention is to provide a suspension system for a vehicle which may be mounted on the vehicle after the vehicle has been manufactured.

A further object of the invention is to provide a suspension system which may be easily installed on the existing vehicle suspension system.

Yet another object of the invention is to provide a suspension system which greatly improves the riding characteristics of the vehicle.

Still another object of the invention is to provide a suspension system for a vehicle having the ability to compensate for heavy loads.

Yet another object of the invention is to provide a suspension system including a pair of air springs which are operatively interconnected to create interaction therebetween thereby increasing the stability of the suspension system.

Yet another object of the invention is to provide a suspension system including a pair of air springs which are mounted between the frame members of the vehicle.

These and other objects will be apparent to those skilled in the art.

BRIEF DESCRIPTION OF THE DRAWINGS

FIG. 5 is a side elevational view of the suspension system of FIG. 4;

FIG. 6 is a rear elevational view of the suspension system of FIG. 4; and

SUMMARY OF THE INVENTION

A suspension system is provided which operatively interconnects the leaf spring assembly positioned adjacent each of the frame members of a vehicle. The suspension system comprises elongated first and second supports which are positioned below the rearward ends of the leaf spring assemblies and which have their forward ends pivotally secured to the axle housing. Each of the first and second supports is connected, forwardly of the rearward end thereof, to the associated leaf spring. A third support is connected to the rearward ends of each of the first and second supports and extends therebetween beneath the frame members. Supported upon the third support is a pair of air springs, the upper ends of which are operatively connected to a frame means secured to and extending between the frame members. A torque arm assembly is also provided.

DESCRIPTION OF THE PREFERRED EMBODIMENT

Figure 1:
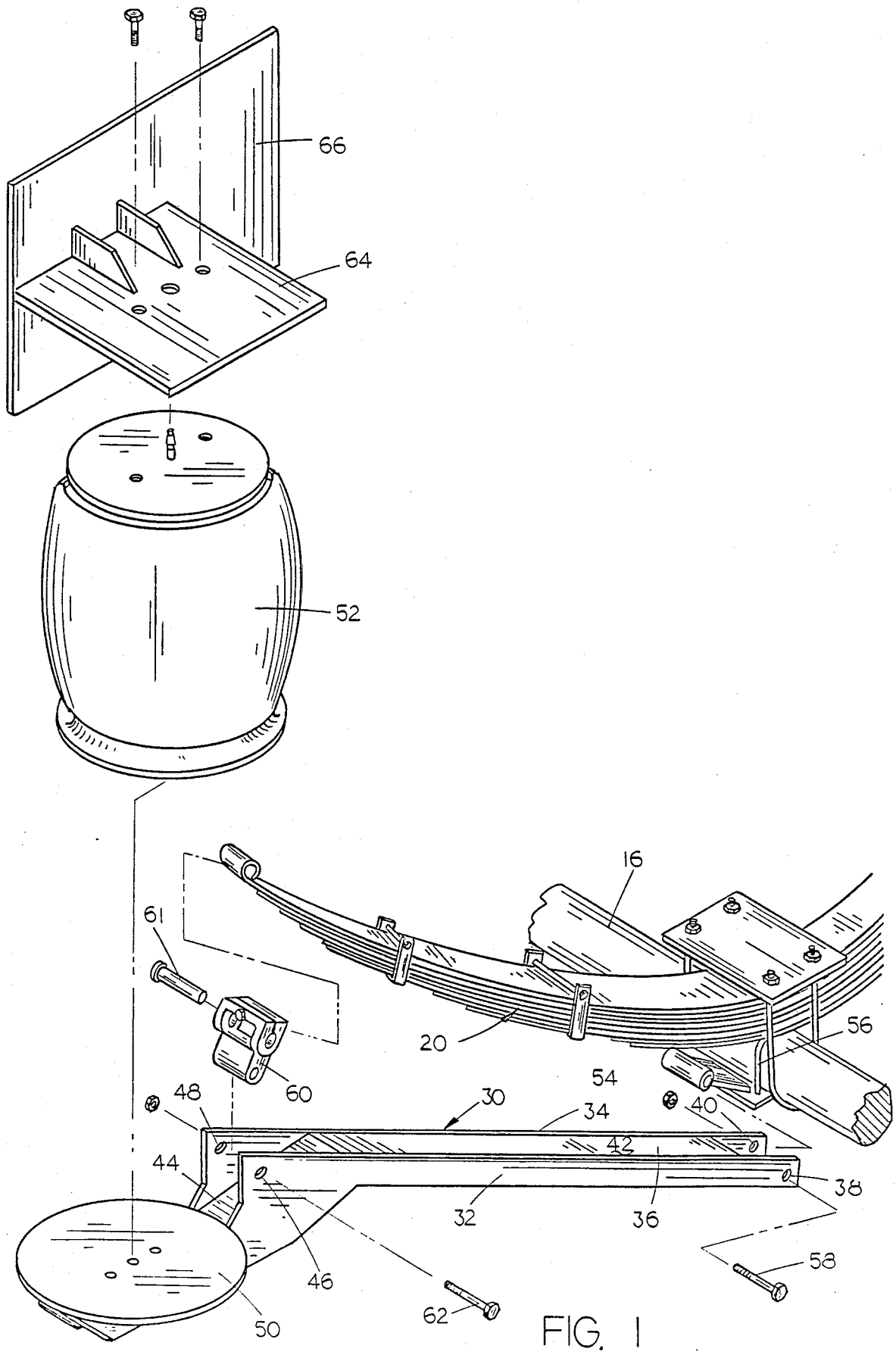
FIG. 1 is an exploded perspective view of the suspension system of the invention disclosed in the co-pending application.
Figure 2:
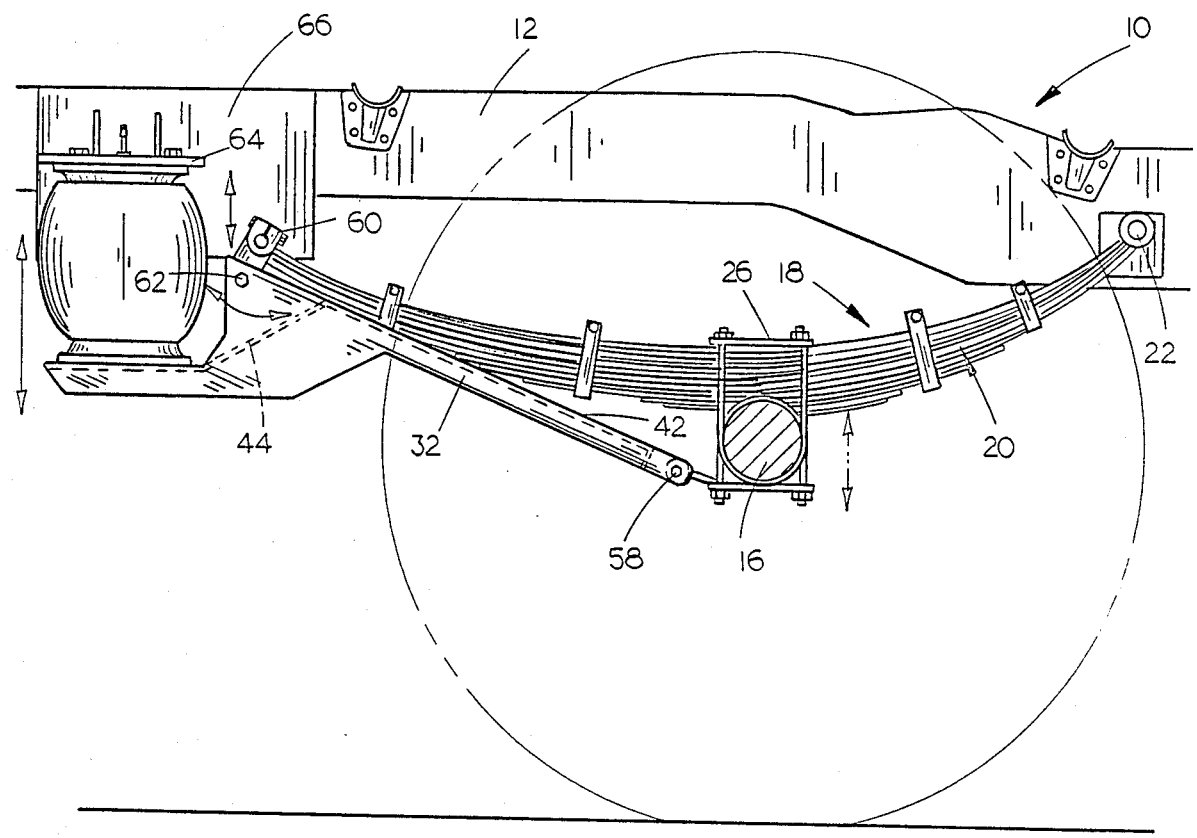
FIG. 2 is a side elevational view of the suspension system of FIG. 1.
Figure 3:
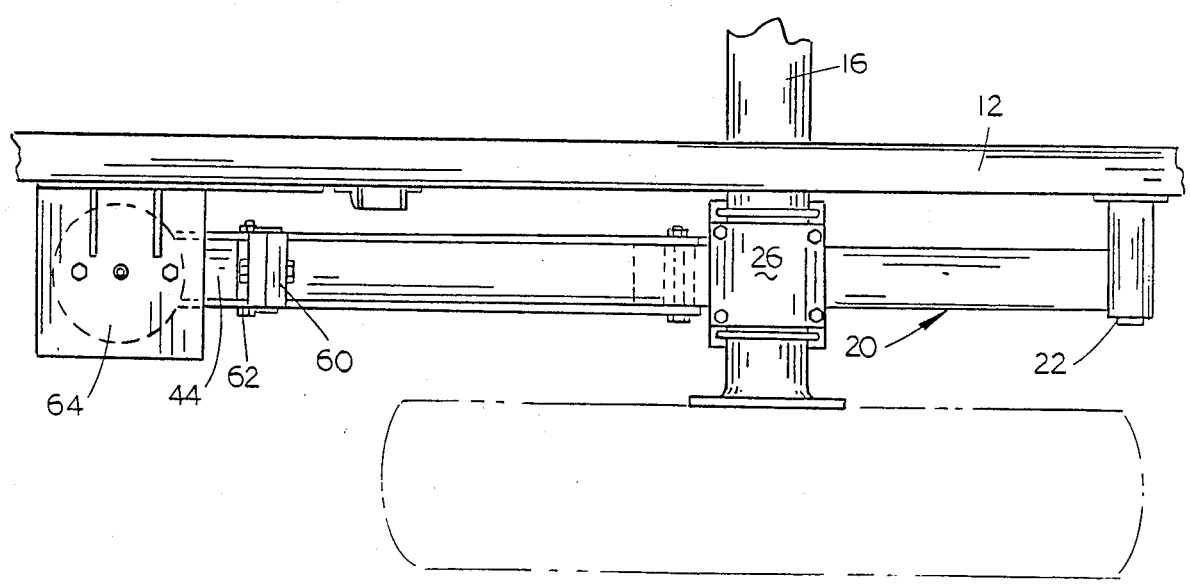
FIG. 3 is a top elevational view of the suspension system of FIG. 1.

FIGS. 1-3 illustrate the invention of the co-pending application.

In FIGS. 1-3, the numeral 10 refers to a conventional truck including a pair of longitudinally extending frame members 12 and 14 (not shown) having a transversely extending axle housing 16 positioned therebelow. Ground engaging wheels are secured to the ends of the axle positioned in the axle housing in conventional fashion. A suspension system 18 normally connects each of the frame members 12 and 14 to the axle housing 16. Each of the suspension systems 18 includes a leaf spring assembly 20 connected at its forward end to the associated frame member by means of a shackle 22. Leaf spring assembly 20 is connected, intermediate the length thereof, to axle housing 24 by U-bolt assembly 26. The rearward end of leaf spring assembly 20 would normally be connected to the associated frame member by means of a suitable shackle. It is this conventional structure which is modified to achieve the suspension system of this invention.

To modify the conventional suspension system, the rearward end of the leaf spring assembly 20 is disconnected from the shackle secured thereto. If the shackle poses an obstruction problem, the shackle may be removed from the frame member by a cutting torch or the like. In the suspension system of this invention, an elongated support means 30 operatively interconnects the axle housing 16, leaf spring assembly 20 to the associated frame member through an air spring as will now be described. Support means 30 includes spaced-apart sides 32 and 34 having a spacer 36 secured thereto and extending therebetween as seen in the drawings thereby forming a rigid non-resilient elongated support means. The forward ends of sides 32 and 34 are provided with openings 38 and 40 formed therein which are positioned forwardly of the forward end of the spacer 36. As seen in the drawings, spacer 36 includes a forward end portion 42 and rearward end portion 44 which extends at an angle therebetween. Sides 32 and 34 are provided with openings 46 and 48 intermediate the ends thereof. Air spring support or plate 50 is provided on the rearward end of the support means 30 and is adapted to have the air spring 52 mounted thereon.

The numeral 54 refers to a bracket which is secured to the axle housing 16 by means of U bolt assembly 56. The forward end of support means 30 is pivotally secured to the bracket 54 by means of bolt 58 extending through the openings 38 and 40 of support means 30. A hanger assembly 60 is pivotally secured to the rearward end of spring assembly 20 by bolt 61 and is pivotally secured to the support means 30 by means of bolt 62 extending through openings 46 and 48 and the hanger 60. The lower end of air spring 52 is mounted on the plate 50 as previously described. The upper end of the air spring 52 is operatively secured to the frame member 12 by means of a top plate 64 which is secured to and which extends laterally from bracket 66 secured to the frame member 12. The amount of air in the air springs may be selectively varied in conventional fashion. It is preferred that the support means 30 at each side of the truck be interconnected by means of a stabilizer bar assembly to prevent lateral movement of the rearward ends of the suspension system.

Prior to use, the air spring 52 is inflated to the desired pressure depending upon the load being carried by the truck. In use, bumps or the like on the road surface which are transmitted to the wheels of the truck causes the axle housing 16 to be moved upwardly towards the frame members of the truck. The rearward end of the leaf spring assembly may move upwardly and downwardly through its pivotal connection with the support means 30. The forward end of the support means 30 also pivots slightly as the axle housing moves upwardly and downwardly relative to the frame member. The air spring resists the upward movement of the rearward end of the support means 30 and also yieldably resists the downward movement of the frame member when a heavy load is carried by the truck. The fact that the support means 30 operatively interconnects the rearward end of the leaf spring assembly with the axle housing and with the air spring results in a much smoother "ride" being obtained than with the conventional leaf spring assembly. This is especially true when the truck is carrying passengers, horses, etc.

Referring now to FIGS. 4–7, the numeral 110 refers to a conventional truck including a pair of longitudinally extending frame members 112 and 114 having a transversely extending axle housing 116 positioned therebelow. Ground engaging wheels are secured to the ends of the axle positioned in the axle housing in conventional fashion. A suspension system 118 normally connects each of the frame members 112 and 114 to the axle housing 116. Each of the suspension systems 118 includes a leaf spring assembly 120 connected at its forward end to the associated frame member by means of a shackle 122. The spring assembly 120 is connected, intermediate the length thereof, to axle housing 124 by U-bolt assembly 126. The rearward ends of leaf spring assemblies 120 would normally be connected to the associated frame member by means of a suitable shackle. It is this conventional structure which is modified to achieve the improved suspension system of this invention.

To modify the conventional suspension system, the rearward ends of the leaf spring assemblies 120 are disconnected from the shackle secured thereto. If the shackle poses an obstruction problem, the shackle may be removed from the frame member by a cutting torch or the like. In the improved suspension system of this invention, a pair of elongated support means 130 and 130' operatively interconnect the axle housing 116, and leaf spring assemblies 120 to the associated frame members through an air spring apparatus as will now be described.

The forward end of support means 130 is pivotally secured to the axle housing 116 by means of bolt 132 extending therethrough and through the rearward end of a bracket 134 secured to housing 116 by means of the U-bolt assembly 126. Inasmuch as the suspension system adjacent frame member 114 is identical to that positioned adjacent frame member 112, only one side of the suspension system will be described with "'" indicating identical structure.

Figure 4:
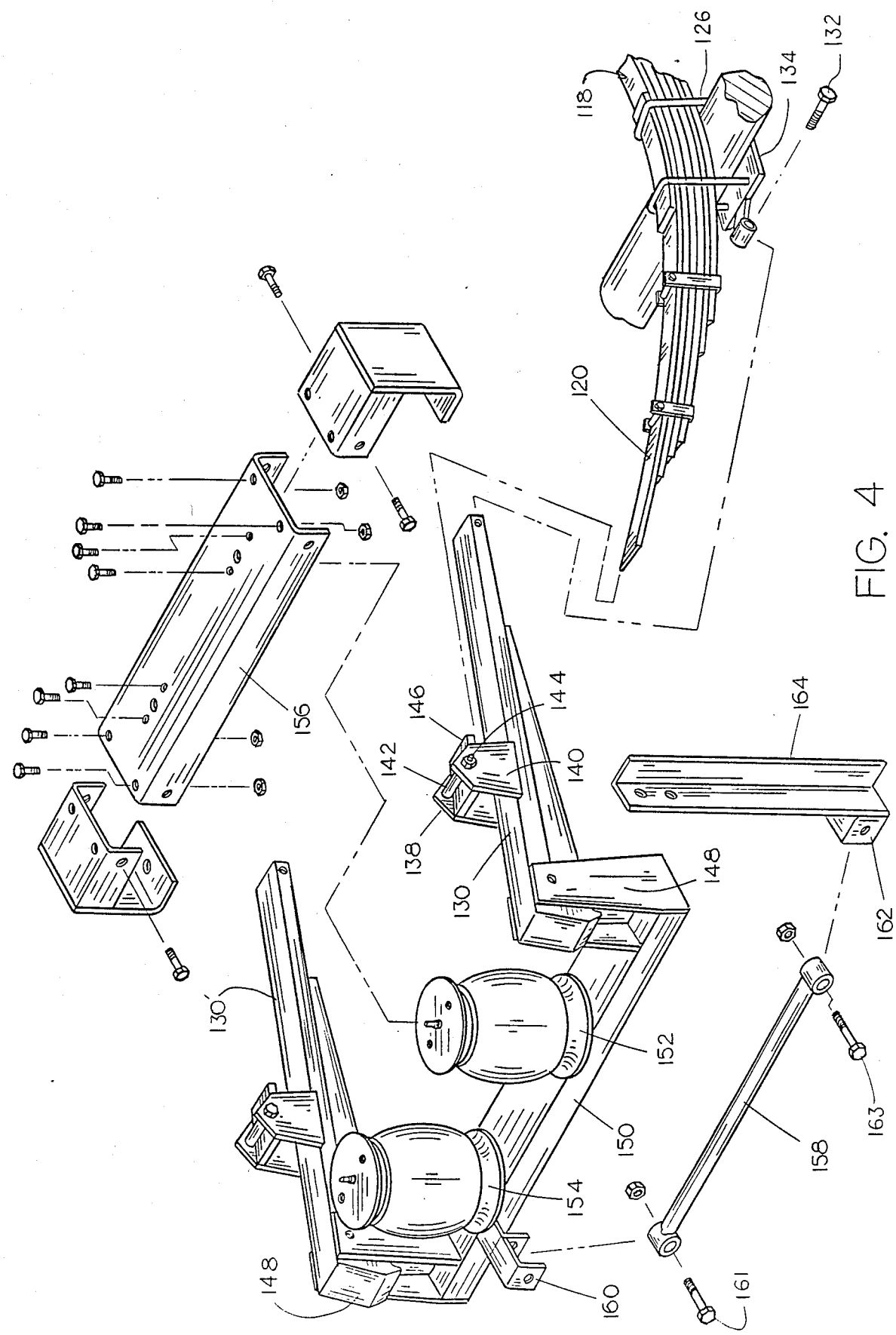
FIG. 4 is an exploded perspective view of the improved suspension system of this invention.
Figure 7:
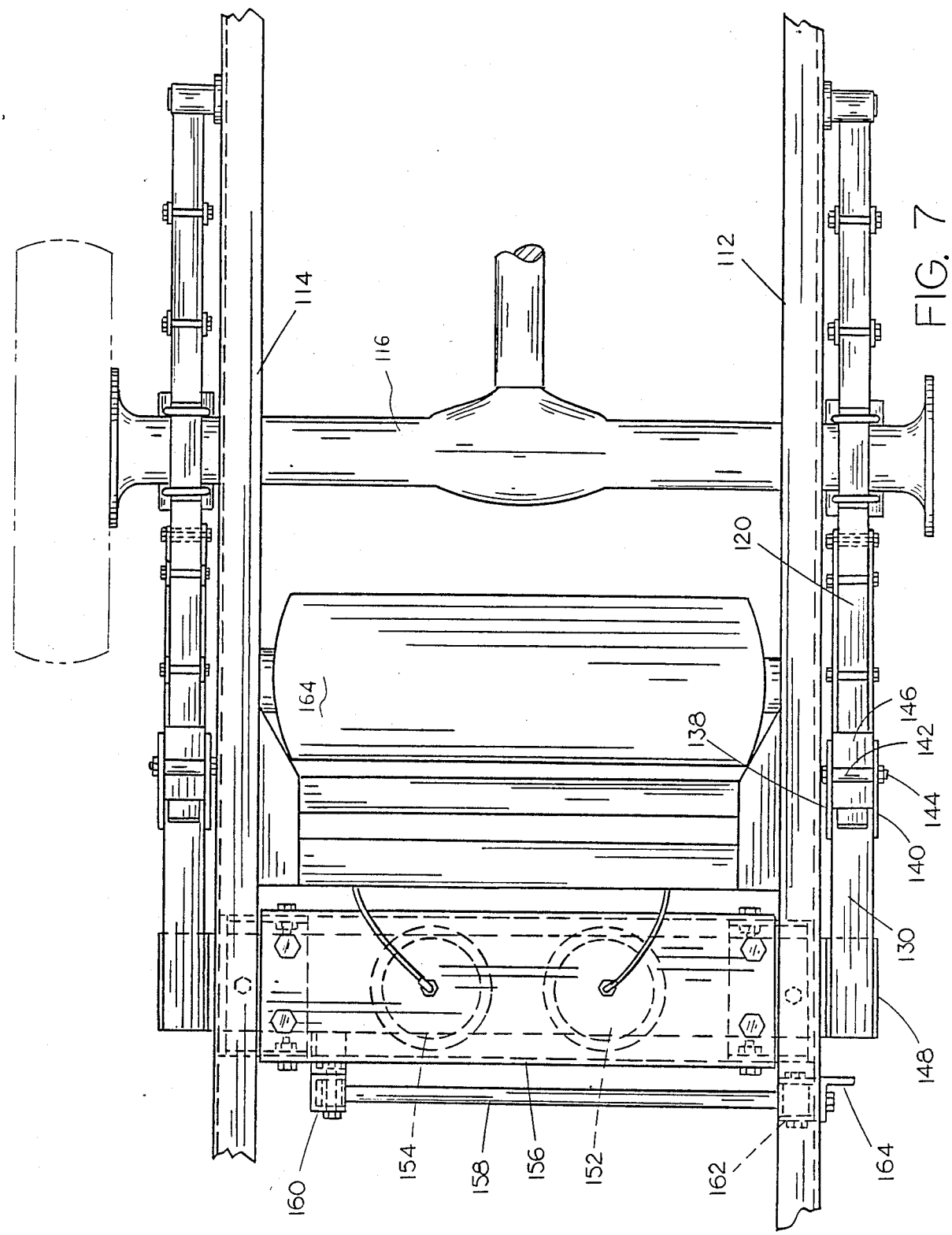
FIG. 7 is a top elevational view of the suspension system of FIG. 4.

A pair of ears 138 and 140 are welded to support means 130 forwardly of the rearward end thereof and extend upwardly therefrom. Collar 142 is positioned between the ears 138 and 140 by means of the bolt 144. Welded to collar 142 is a bar 146. The attachment of collar 142 to the ears 138 and 140 permits bar 146 to pivotally move relative to ears 138 and 140. Bar 146 rests on the upper rearward end of the leaf spring assembly 120 as seen in the drawings. Supports 148 and 148' extend downwardly from the rearward ends of support means 130 and 130' respectively and have support means 150 secured thereto and extending therebetween as seen in FIG. 4. A pair of air springs 152 and 154 are supported on support means 150 as seen in the drawings. A frame member 156 is secured to frame members 112 and 114 and extends therebetween above the upper ends of air springs 152 and 154 as seen in FIG. 7. The upper ends of air springs 152 and 154 are operatively secured to the frame member 156 by any conventional means.

One end of torque bar 158 is pivotally connected to support means 150 by bracket 160 and bolt 161 and extends laterally therefrom. The other end of torque bar 158 is pivotally secured to bracket 162 by bolt 163. Arm 164 is secured to bracket 162 and extends upwardly therefrom as seen in the drawing. The upper end of bracket 162 is bolted to frame member 112 as seen in FIG. 6. Torque bar 58 tends to stabilize the suspension system through its connection with frame member 112 and support means 150. An air tank 164 is positioned between frame members 112 and 114 and is connected to the air springs 152 and 154 for supplying air thereto as required. A suitable air control means is also provided for selectively supplying air to the air springs.

The air suspension system of this invention permits a conventional truck suspension system to be easily modified to provide an air suspension system. The mounting of the air springs between the frame members 112 and 114 permits a truck to be converted even though there is not sufficient room for the air springs outwardly of the frame members. Further, the fact that the air springs are mounted on a common support which is interconnected to the suspension at each side of the truck provides a suspension system which is stable and which provides a smooth ride.

It can therefore be seen that the invention accomplishes at least all of its stated objectives.

I claim:

1. A suspension system for wheeled vehicles including a pair of spaced-apart longitudinally extending frame members having rearward and forward ends, a transversely extending axle housing positioned beneath said frame members forwardly of the rearward ends thereof, comprising, a leaf spring means having rearward and forward ends positioned adjacent each of said frame members and having only its forward end secured to the associated frame member forwardly of said axle housing, said leaf spring means being rigidly secured, intermediate its ends, to said axle housing, the rearward end of said leaf spring means being positioned rearwardly of the axle housing, a pair of rigid non-resilient elongated first and second supports having rearward and forward ends, the forward end of each of said first and second supports being pivotally secured to said axle housing, each of said first and second supports being in operative engagement, forwardly of its rearward end, with the rearward end of the associated leaf spring means, each of said first and second supports extending upwardly and rearwardly from the axle housing, a third support secured to the rearward end of each of said first and second supports and extending therebetween beneath said frame members, a pair of air spring means having upper and lower ends, the lower ends of said air spring means being mounted on said third support in a spaced-apart relationship, a frame means secured to said frame members and extending therebetween above said air spring means, and means operatively connecting the upper ends of said air spring means to said frame means whereby said air spring means will yieldably resist the upward movement of said axle housing and the rearward end of said leaf spring means toward said frame members and will yieldably resist the downward movement of said frame members toward said axle housing, each of said first and second supports having a pair of spaced-apart ears secured thereto which extend upwardly and forwardly from the rearward ends thereof, and a flat support plate positioned between said ears and being pivotally secured thereto, said support plate engaging the upper rearward end of the associated leaf springs and being in substantially flush engagement with said leaf spring means to allow slidable movement therebetween.

* * * * *